United States Patent
Liu et al.

(10) Patent No.: US 8,892,790 B2
(45) Date of Patent: Nov. 18, 2014

(54) CONTROL PANEL AND SERIAL PORT COMMUNICATION ARBITER FOR TOUCH SCREEN WITH CAMERA

(75) Inventors: Yang Liu, Beijing (CN); Weizheng Zhang, Beijing (CN); Xinlin Ye, Beijing (CN); Jianjun Liu, Beijing (CN); Xinbin Liu, Beijing (CN)

(73) Assignee: Beijing Irtouch Systems Co., Ltd, Beijing (CN)

( * ) Notice: Subject to any disclaimer, the term of this patent is extended or adjusted under 35 U.S.C. 154(b) by 55 days.

(21) Appl. No.: 13/634,196

(22) PCT Filed: Mar. 11, 2011

(86) PCT No.: PCT/CN2011/071721
§ 371 (c)(1),
(2), (4) Date: Sep. 11, 2012

(87) PCT Pub. No.: WO2011/110100
PCT Pub. Date: Sep. 15, 2011

(65) Prior Publication Data
US 2013/0007312 A1 Jan. 3, 2013

(30) Foreign Application Priority Data
Mar. 12, 2010 (CN) .......................... 2010 1 0124781

(51) Int. Cl.
*G06F 13/14* (2006.01)

(52) U.S. Cl.
USPC ................ 710/33; 710/34; 345/173; 345/175

(58) Field of Classification Search
USPC ........................................ 710/33, 34; 345/173
See application file for complete search history.

(56) References Cited

U.S. PATENT DOCUMENTS

| 6,633,280 B1 * | 10/2003 | Matsumoto et al. .......... 345/173 |
| 7,460,110 B2 | 12/2008 | Ung et al. |
| 2009/0313567 A1 * | 12/2009 | Kwon et al. .................. 715/769 |
| 2011/0032215 A1 * | 2/2011 | Sirotich et al. ................ 345/175 |

FOREIGN PATENT DOCUMENTS

| CN | 101620483 | 1/2010 |
| EP | 2128743 | 12/2009 |

* cited by examiner

*Primary Examiner* — Tammara Peyton
(74) *Attorney, Agent, or Firm* — Harness, Dickey & Pierce, P.L.C.

(57) ABSTRACT

A control panel and a serial port communication arbiter for a touch screen with a camera are provided. A serial port communication method for a touch screen with a camera includes: transmitting a channel request message to the serial port communication arbiter, the channel request message being used for requesting for occupying the channel between the control panel of the touch screen with camera and an upper computer; receiving a channel response message transmitted by the serial port communication arbiter, the channel response message containing a state of the channel; transmitting data to the upper computer over the channel if the state of the channel is idle. It can save production cost of the control panel, improve system performance, and facilitate maintenance of the control panel.

19 Claims, 6 Drawing Sheets

CONTROL PANEL AND SERIAL PORT COMMUNICATION ARBITER FOR TOUCH SCREEN WITH CAMERA

TECHNICAL FIELD OF THE INVENTION

The present invention relates to the photoelectric technical field, more particularly, to a control panel and a serial port communication arbiter for a touch screen with camera.

BACKGROUND OF THE INVENTION

With the popularization of computer technology, touch screen technology is developed as a new technology of human-computer interaction in the early 1990s. Using this technology, a user can operate a computer just by gently touching graphics or texts in computer screen with a finger or a stylus etc., which gets rid of restrictions of keyboard and mouse and brings considerable convenience to the user.

The touch screens commonly used now include infrared touch screen and touch screen with camera. The infrared touch screen uses plenty of infrared emitters and infrared receivers which correspond to each other for determining location information of a touch object, and its working principle is simple. However, as the infrared touch screen requires plenty of infrared elements and installation and test thereof is complicated, the production cost is high. Moreover, as the infrared emitters and infrared receivers are prone to aging, the infrared touch screen has poor reliability. Conversely, the touch screen with camera is widely used as its simple structure, low cost, easy production and high reliability.

The touch screen with camera usually comprises two control panels, a main panel and an auxiliary panel, wherein the auxiliary panel has a serial communication interface (hereinafter referred to as a serial port), and the main panel has at least two serial ports. The auxiliary panel makes data communication with the main panel via the serial port, while the main panel makes data communication with the auxiliary panel via the serial port and with an upper computer (e.g. PC) via the other serial port. The auxiliary panel cannot make data communication directly with the upper computer, so it must make data communication with the upper computer via the main panel. For example, when the auxiliary panel wants to transmit data to the upper computer, it must first transmit the data to the main panel which then transmit the data to the upper computer, and when the upper computer wants to transmit data to the auxiliary panel, it also must first transmit the data to the main panel which then transmit the data to the auxiliary panel.

The inventor finds out that there are three defects in the above communications: (1) the main panel has a plurality of serial ports which leads to high cost; (2) processing burden of the main panel is heavy, which degrades the system performance; (3) controller programs for the main and auxiliary panels are different, which makes maintenance difficult.

SUMMARY OF THE INVENTION

The present invention provides a serial port communication arbiter for a touch screen with camera, which reduces the cost of control panels, improves system performance, and facilitates the maintenance of the control panels.

The present invention provides a serial port communication method for a touch screen with camera, which comprises:

transmitting a channel request message to a serial port communication arbiter, the channel request message requesting for occupying a channel between a control panel of the touch screen with camera and an upper computer;

receiving a channel response message transmitted by the serial port communication arbiter, the channel response message containing a state of the channel; and transmitting data to the upper computer over the channel, if the state of the channel is "Idle".

The present invention also provides a serial port communication method for a touch screen with camera, which comprises:

receiving a channel request message sent by either control panel of the touch screen with camera, the channel request message requesting for occupying a channel between the control panel and an upper computer;

checking a state of the channel between the control panel and the upper computer based on the channel request message, and if the state of the channel is "Idle", assigning the channel to the control panel;

transmitting a channel response message to the control panel, the channel response message containing the state of the channel.

The present invention further provides a control panel for a touch screen with camera, which comprises:

channel request message transmitting module configured to transmit a channel request message to a serial port communication arbiter, the channel request message requesting for occupying a channel between the control panel of the touch screen with camera and an upper computer;

a channel response message receiving module configured to receive a channel response message sent by the serial port communication arbiter, the channel response message containing a state of the channel; and a first data transmitting module configured to transmit data to the upper computer over the channel if the state of the channel is "Idle".

The present invention further provides a serial port communication arbiter for a touch screen with camera, which comprises:

a channel request message receiving module configured to receive a channel request message sent by either control panel of the touch screen with camera, the channel request message requesting for occupying a channel between the control panel and an upper computer;

a channel state checking module configured to check a state of the channel between the control panel and the upper computer based on the channel request message;

a channel assigning module configured to assign the channel to the control panel if the state of the channel is "Idle"; and a channel response message transmitting module configured to transmit a channel response message to the control panel, the channel response message containing the state of the channel.

The present invention further provides a touch screen with camera, which comprises at least two cameras, at least two light sources installed adjacent to the at least two cameras respectively, a retro-reflection strip disposed in the vicinity of a touch detection area or a touch object provided with a retro-reflection strip, and a processing unit comprising a location information acquiring module connected to the at least two cameras for acquiring location information of the touch object based on image data collected by the at least two cameras, characterized in that the processing unit further comprises at least two control panels and a serial port communication arbiter, wherein, each of the control panels is configured to transmit a channel request message to the serial port communication arbiter, the channel request message requesting for occupying a channel between the control panel and an upper computer;

the serial port communication arbiter is configured to receive the channel request message sent by the control panel, check a state of the channel between the control panel and the upper computer based on the channel request message, transmit a channel response message to the control panel, the channel response message containing a state of the channel, and assign the channel to the control panel if the state of the channel is "Idle";

each of the control panel is further configured to receive the channel response message sent by the serial port communication arbiter, and transmit data to the upper computer over the channel if the state of the channel is "Idle".

The present invention further provides a touch screen with camera, which comprises at least one camera, a light source installed in the vicinity of a touch detection area of the touch screen with camera, and a processing unit comprising a location information acquiring module connected to the at least one cameras for acquiring location information of a touch object based on image data collected by the at least one cameras, characterized in that the processing unit further comprises at least two control panels and a serial port communication arbiter, wherein, each of the control panels is configured to transmit a channel request message to the serial port communication arbiter, the channel request message requesting for occupying a channel between the control panel and an upper computer;

the serial port communication arbiter is configured to receive the channel request message transmitted by the control panel, check a state of the channel between the control panel and the upper computer based on the channel request message, transmit a channel response message to the control panel, the channel response message containing a state of the channel, and assign the channel to the control panel if the state of the channel is "Idle";

each of the control panels is further configured to receive the channel response message sent by the serial port communication arbiter, and transmit data to the upper computer over the channel if the state of the channel is "Idle".

In the present invention, the control panel first transmits the channel request message to the serial port communication arbiter which then transmits the state of the channel to the control panel. If the state of the channel is "Idle", the control panel transmits data to the upper computer over the channel between the control panel and the upper computer. As all the control panels can directly transmit data to the upper computer, only one serial port is required for each control panel, and no serial port is required between the control panels, so the production cost of the control panel is saved. Furthermore, all the control panels can directly communicate with the upper computer, and thus the processing burden of the main panel can be reduced and the system performance can be improved. Moreover, programs for all the control panels are the same, which facilitates the maintenance.

DETAILED DESCRIPTION OF THE PREFERRED EMBODIMENTS

Next, the present invention will be further illustrated by way of accompanying drawings in conjunction with embodiments in detail.

Serial Port Communication Method for a Touch Screen with Camera

First Embodiment

Figure 1:
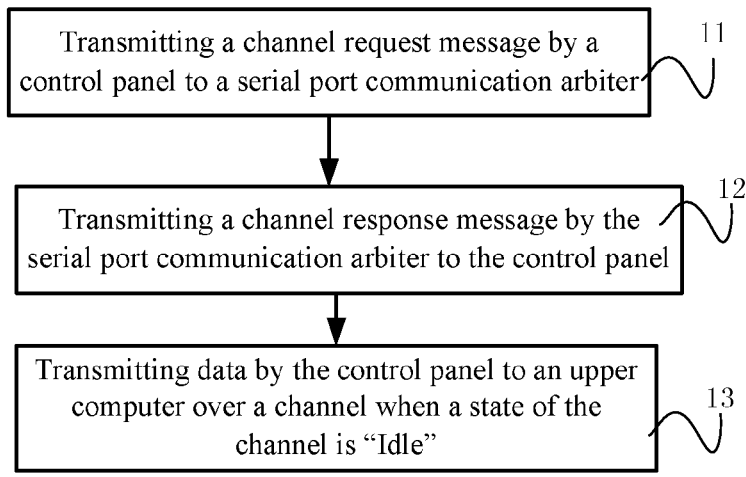
FIG. 1 is a flow diagram of a first embodiment of the serial port communication method for a touch screen with camera according to the present invention.

FIG. 1 shows the flow diagram of the first embodiment of the serial port communication method for a touch screen with camera according to the present invention.

At step 11, a control panel transmits a channel request message to a serial port communication arbiter.

Specifically, the channel request message requests for occupying a channel between the control panel of the touch screen with camera and an upper computer.

At step 12, the serial port communication arbiter transmits a channel response message to the control panel.

Specifically, the serial port communication arbiter receives the channel request message sent by the control panel. Based on the channel request message, the serial port communication arbiter checks a state of the channel between the control panel and the upper computer. Then the serial port communication arbiter transmits the channel response message to the control panel, the channel response message containing the state of the channel. If the state of the channel is "Idle", the serial port communication arbiter assigns the channel to control panel.

At step 13, the control panel transmits data to the upper computer over the channel if the state of the channel is "Idle".

Specifically, the control panel receives the channel response message sent by the serial port communication arbiter. If the state of the channel is "Idle", the control panel transmits the data to the upper computer over the channel; if the state of the channel is "Non-Idle", the control panel continues transmitting the channel request message to the serial port communication arbiter, until the serial port communication arbiter assigns the channel to the control panel.

In this embodiment, the control panel first transmits the channel request message to the serial port communication controller, which then transmits the state of the channel to the control panel. When the state of the channel is "Idle", the control panel transmits the data to the upper computer over the channel between the control panel and the upper computer. As all the control panels can directly transmit the data to the upper computer, only one serial port is required for each control panel, and no serial port is required between the control panels, thus the production cost for the control panel can be saved. Furthermore, all the control panels can directly communicate with the upper computer, therefore, the processing burden of the main panel can be reduced and the system performance can be improved. Moreover, programs for all the control panels are the same, which facilitates the maintenance.

Second Embodiment

Figure 2:
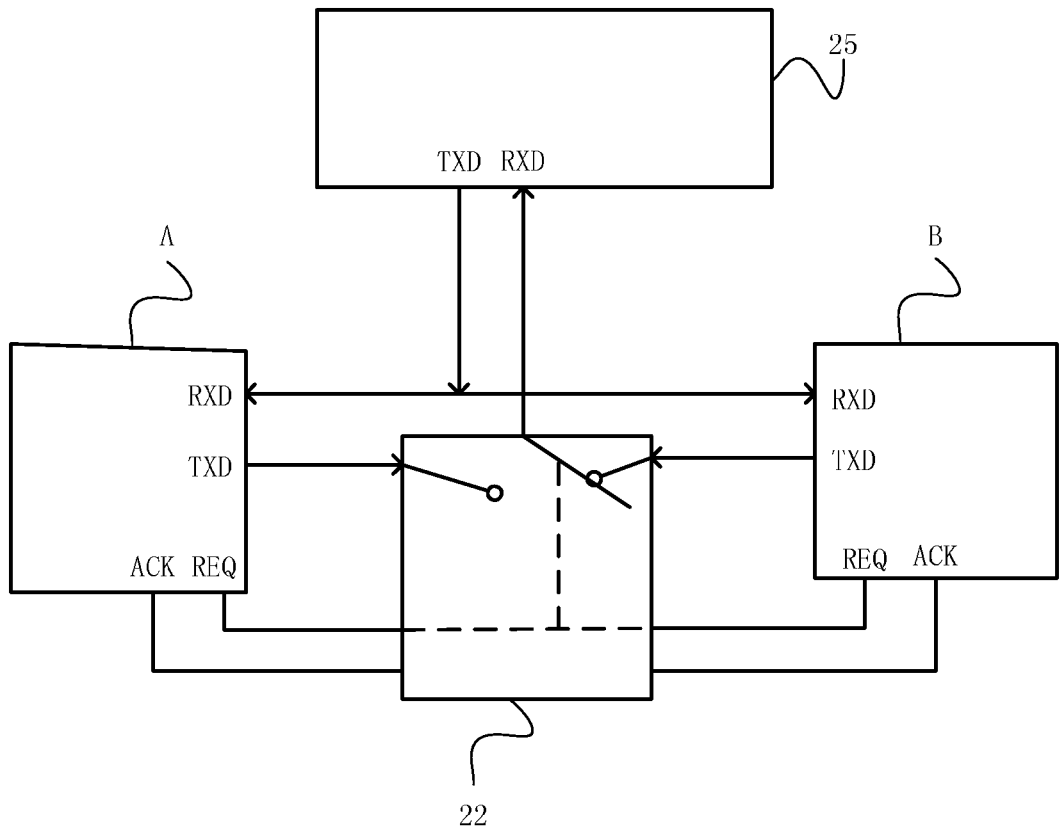
FIG. 2 is a diagram of an application scenario for a second embodiment of the serial port communication method for a touch screen with camera according to the present invention.

The present embodiment may be applied in the following scenario: as shown in FIG. 2, it comprises the control panels A, B and a serial port communication arbiter 22. The control panels A, B have the same structure. Each control panel comprises a serial port which comprises a transmitting end TXD and a receiving end RXD. Each control panel corresponds to two channel lines: a channel request line REQ and a channel response line ACK. The upper computer 25 (e.g. PC) comprises a transmitting end TXD and a receiving end RXD. There is a channel between the transmitting end TXD of each control panel and the receiving end RXD of the upper computer 25 for transmitting the data by the control panel to the upper computer 25. There is a channel between the receiving end RXD of each control panel and the transmitting end TXD of the upper computer 25 for transmitting the data by the upper computer 25 to the control panel.

Figure 3:
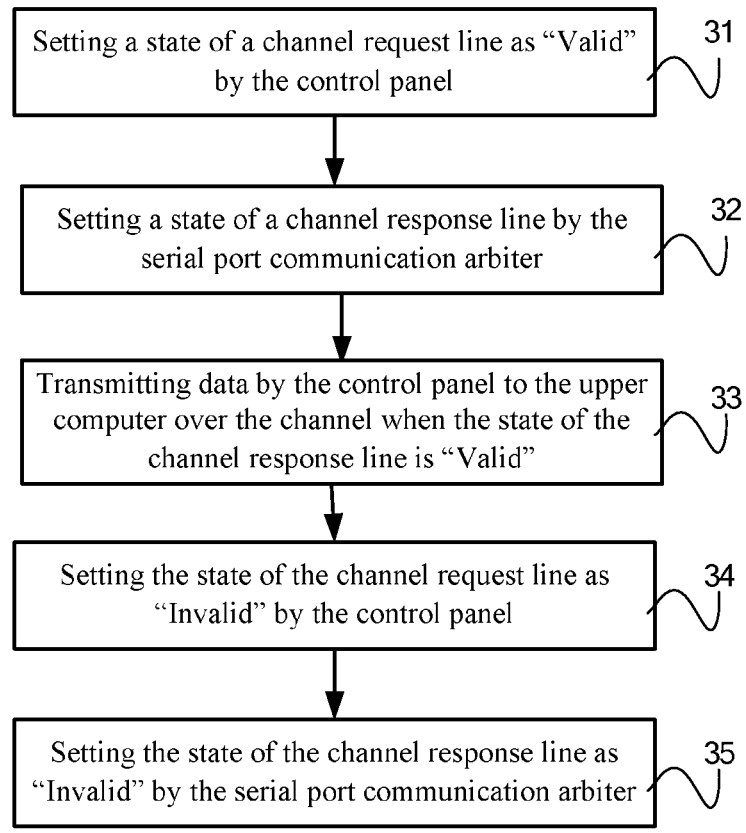
FIG. 3 is a flow diagram of the second embodiment of the serial port communication method for the touch screen with camera according to the present invention.

FIG. 3 shows the flow diagram of the second embodiment of the serial port communication method for the touch screen with camera according to the present invention.

At step 31, the control panel sets a state of the channel request line as "Valid".

Specifically, the control panel transmits the channel request message to the serial port communication arbiter by setting the state of the channel request line. When the control panel sets the state of the channel request line as "Valid", it is equivalent to transmitting the channel request message to the serial port communication arbiter. When the control panel sets the state of the channel request line as "Invalid", it is equivalent to transmitting no channel request message to the serial port communication arbiter. When the control panel wants to transmit the data, it sets the state of the channel request line as "Valid". For example, the control panel sets a level of the channel request line to a high level.

At step 32, the serial port communication arbiter sets the state of the channel response line.

Specifically, the serial port communication arbiter receives the channel request message sent by the control panel by checking the state of the channel request line between the serial port communication arbiter and the control panel. When the state of the channel request line is "Valid", it is equivalent to that the serial port communication arbiter receives the channel request message sent by the control panel. When the state of the channel request line is "Invalid", it is equivalent to that the serial port communication arbiter does not receive the channel request message sent by the control panel. The serial port communication arbiter transmits the channel response message to the control panel by setting the state of the channel response line between the serial port communication arbiter and the control panel based on the state of the channel between the control panel and the upper computer. When the serial port communication arbiter sets the state of the channel response line as "Valid", it is equivalent to that the serial port communication arbiter transmits the channel response message to the control panel. When the serial port communication arbiter sets the state of the channel response line as "Invalid", it is equivalent to that the serial port communication arbiter does not transmit the channel response message to the control panel. When the serial port communication arbiter checks that the state of the channel request line is "Valid", for example, when the serial port communication arbiter checks that the level of the channel request line is high, the serial port communication arbiter checks the state of the channel between the control panel and the upper computer. When the state of the channel is "Idle", the serial port communication arbiter sets the state of the channel response line between the control panel and the serial port communication arbiter as "Valid" and assigns the channel to the control panel. When the state of the channel is "Non-Idle", i.e. when the channel is occupied by other control panel, the serial port communication arbiter sets the state of the channel response line between the control panel and the serial port communication arbiter as "Invalid".

At step 33, when the state of the channel response line is "Valid", the control panel transmits the data to the upper computer over the channel.

Specifically, the control panel checks the state of the channel response line between the control panel and the serial port communication arbiter. When the control panel checks that the state of the channel response line is "Valid", the control panel transmits the data to the upper computer over the channel between the control panel and the upper computer.

At step 34, the control panel sets the state of the channel request line as "Invalid".

Specifically, when the data transmission is completed, the control panel sets the state of the channel request line between the control panel and the serial port communication arbiter as "Invalid". For example, the control panel sets the level of the channel request line to low.

At step 35, the serial port communication arbiter sets the state of the channel response line as "Invalid".

Specifically, when the data transmission is completed, the control panel releases the channel between the control panel and the upper computer, and sets the state of the channel request line between the control panel and the serial port communication arbiter as "Invalid". Then the serial port communication arbiter checks that the state of the channel request line is "Invalid", and sets the state of the channel response line as "Invalid".

In this embodiment, the upper computer can transmit the data to each of the control panels over the channel between the control panel and the upper computer in broadcasting way. The data contains a control panel identifier for identifying the control panel. Upon receiving the data sent by the upper computer, the control panel determines whether the control panel identifier in the data is identical to its identifier. When the two identifiers are identical, the control panel processes the data. Otherwise the control panel does not process the data.

Figure 4:
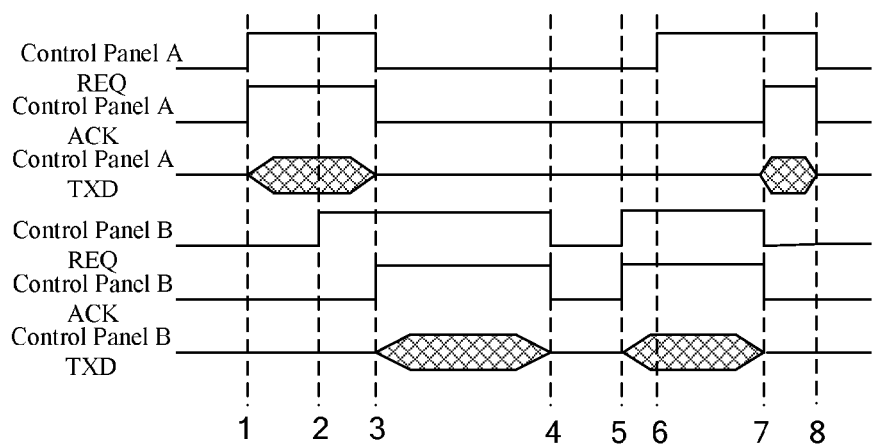
FIG. 4 is a working logic diagram in the application scenario shown in FIG. 2 of the second embodiment of the serial port communication method for the touch screen with camera according to the present invention.

FIG. 4 shows the working logic diagram in the scenario shown in FIG. 2 of the second embodiment of the serial port communication method for the touch screen with camera according to the present invention.

At the time point 1, the control panel A sets the level of the channel request line REQ between the control panel A and the serial port communication arbiter 22 to high level to request for occupying a channel from the serial port communication arbiter 22. At this point, as the control panel B does not occupy the channel, the level of the channel response line ACK between the control panel A and the serial port communication arbiter 22 is high, and the control panel A can occupy the channel to transmit the data until the time point 3 at which the data transmission is completed.

At the time point 2, the control panel B sets the level of the channel request line REQ between the control panel B and the serial port communication arbiter 22 to high level to request for occupying a channel from the serial port communication arbiter 22. At this point, as the control panel A occupies the channel, the level of the channel response line ACK between the control panel B and the serial port communication arbiter 22 is low, and the control panel B cannot occupy the channel. Thus the level of the channel request line REQ between the control panel B and the serial port communication arbiter 22 keeps high.

At the time point 3, after completing transmitting the data, the control panel A sets the level of the channel request line REQ between the control panel A and the serial port communication arbiter 22 to low, and releases the channel between the control panel A and the upper computer 25. So the level of the channel response line ACK between the control panel A and the serial port communication arbiter 22 becomes low, while the level of the channel request line REQ between the control panel B and the serial port communication arbiter 22 becomes high. Therefore, the level of the channel response line ACK between the control panel B and the serial port communication arbiter 22 is high, and the control panel B can occupy the channel to start transmitting the data until the time point 4.

At the time point 5, the control panel B sets the level of the channel request line REQ between the control panel B and the serial port communication arbiter 22 to high level to request for occupying a channel from the serial port communication arbiter 22. As the control panel A does not occupy the channel, the level of the channel response line ACK between the control panel B and the serial port communication arbiter 22 is high, and the control panel B can occupy the channel to transmit the data until the time point 7.

At the time point 6, the control panel A sets the level of the channel request line REQ between the control panel A and the serial port communication arbiter 22 to high level to request for occupying a channel from the serial port communication arbiter 22. At this point, as the control panel B occupies the channel, the level of the channel response line ACK between the control panel A and the serial port communication arbiter 22 is low, and the control panel A cannot occupy the channel. Thus the level of the channel request line REQ between the control panel A and the serial port communication arbiter 22 keeps high.

At the time point 7, after finishing transmitting the data, the control panel B sets the level of the channel request line REQ between the control panel B and the serial port communication arbiter 22 to low, and releases the channel between the control panel B and the upper computer 25. So the level of the channel response line ACK between the control panel B and the serial port communication arbiter 22 becomes low, while the level of the channel request line REQ between the control panel A and the serial port communication arbiter 22 becomes high. Therefore, the level of the channel response line ACK between the control panel A and the serial port communication arbiter 22 is high, and the control panel A can occupy the channel to start transmitting the data until the time point 8.

In this embodiment, when the control panel wants to transmit the data to the upper computer, it first sets the state of the channel request line between the control panel and the serial port communication arbiter as "Valid", and the serial port communication arbiter checks the state of the channel between the control panel and the upper computer. When the state of the channel between the control panel and the upper computer is "Idle", the state of the channel response line between the control panel and the serial port communication arbiter is set as "Valid". Then the control panel transmits the data to the upper computer over the channel between the control panel and the upper computer. As all the control panels can directly transmit data to the upper computer, only one serial port is required for each control panel, and no serial port is required between the control panels. Thus the production cost for the control panel can be saved. Furthermore, all the control panels can directly communicate with the upper computer, so the processing burden of the main panel can be reduced and the system performance can be improved. Moreover, programs for all the control panels are the same, which facilitates the maintenance.

Furthermore, each control panel can receive the data sent by the upper computer in broadcasting way, so the control panel can process the data synchronously.

Control Panel for a Touch Screen with Camera

First Embodiment

Figure 5:
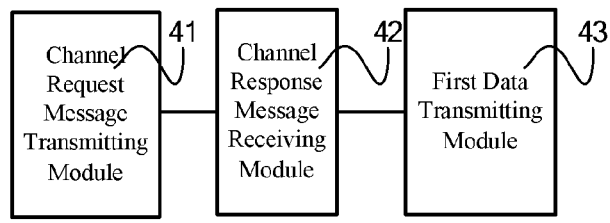
FIG. 5 is a structure diagram of a first embodiment of a control panel for a touch screen with camera according to the present invention.

FIG. 5 shows a structure diagram of the first embodiment of the control panel for the touch screen with camera according to the present invention. The control panel can include a channel request message transmitting module 41, a channel response message receiving module 42 and a first data transmitting module 43. The channel response message receiving module 42 is connected to the channel request message transmitting module 41, and the first data transmitting module 43 is connected to the channel response message receiving module 42.

The channel request message transmitting module 41 is configured to transmit the channel request message to the serial port communication arbiter for requesting for occupying the channel between the control panel of the touch screen with camera and the upper computer. The channel response message receiving module 42 is configured to receive the channel response message sent by the serial port communication arbiter. The channel response message contains the state of the channel between the control panel and the upper computer. The first data transmitting module 43 is configured to transmit the data to the upper computer over the channel between the control panel and the upper computer when the state of the channel between the control panel and the upper computer is "Idle".

In this embodiment, the channel request message transmitting module 41 transmits the channel request message to the serial port communication arbiter, and the channel response message receiving module 42 receives the channel response message sent from the serial port communication arbiter. When the state of the channel between the control panel and the upper computer is "Idle", the first data transmitting module 43 transmits the data to the upper computer over the channel between the control panel and the upper computer. Only one serial port is required for each control panel, and no serial port is required between the control panels, so the production cost for the control panel is saved. Furthermore, all the control panels can directly communicate with the upper computer, so the processing burden of the main panel can be reduced and the system performance can be improved. Moreover, programs for all the control panels are the same, which facilitates the maintenance.

Second Embodiment

Figure 6:
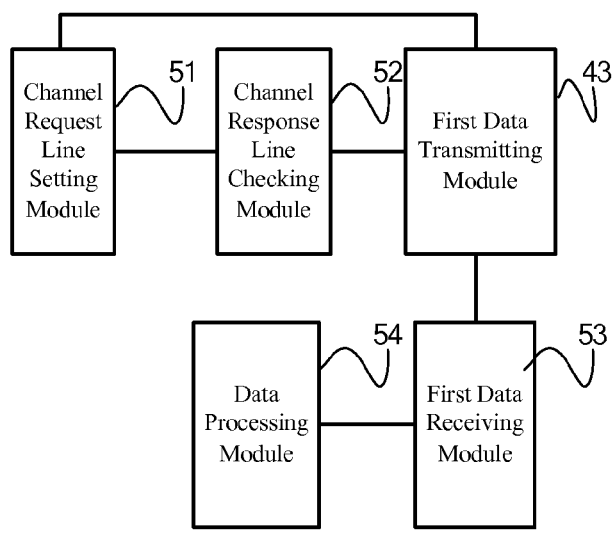
FIG. 6 is a structure diagram of a second embodiment of the control panel for the touch screen with camera according to the present invention.

FIG. 6 shows the structure diagram of the second embodiment of the control panel for the touch screen with camera according to the present invention, which differs from the structure diagram shown in FIG. 5 in that: in this embodiment, the channel request message transmitting module 41 can be a channel request line setting module 51, and the channel response message receiving module 42 can be a channel response line checking module 52. The channel request line setting module 51 is configured to transmit the channel request message to the serial port communication arbiter by setting the state of the channel request line between the control panel and the serial port communication arbiter as "Valid". Specifically, when the control panel sets the state of the channel request line as "Valid", it is equivalent to transmitting the channel request message to the serial port communication arbiter, and when the control panel sets the state of the channel request line as "Invalid", it is equivalent to transmitting no channel request message to the serial port communication arbiter. When the control panel wants to transmit the data to the upper computer, the channel request line setting module 51 sets the state of the channel request line between the control panel and the serial port communication arbiter as "Valid". The channel response line checking module 52 is configured to receive the channel response message sent by the serial port communication arbiter by checking the state of the channel response line. Specifically, when the state of the channel response line is "Valid", it is equivalent to receiving the channel response message sent by the serial port communication arbiter, and when the state of the channel response line is "Invalid", it is equivalent to receiving no channel response message sent by the serial port communication arbiter. When the state of the channel between the control panel and the upper computer is "Idle", the state of the channel response line is "Valid", e.g. in high level. When the state of the channel between the control panel and the upper computer is "Non-Idle", the state of the channel response line is "Invalid", e.g. in low level.

In this embodiment, the first data transmitting module 43 is configured to transmit the data to the upper computer over the channel between the control panel and the upper computer when the state of the channel response line is "Valid".

In this embodiment, the channel request line setting module 51 can further be connected to the first data transmitting module 43 configured to set the state of the channel request line as "Invalid" after the data transmission is completed.

The control panel of the embodiment can further include a first data receiving module 53 and a data processing module 54. The first data receiving module 53 shares the same serial port with the first data transmitting module 43 and is configured to receive the data sent by the upper computer in broadcasting way over the channel between the upper computer and the control panel. The data includes a control panel identifier for identifying the control panel. The data processing module 54 is configured to process the data when the control panel identifier in the data is identical to the control panel identifier of the control panel. When the control panel identifier in the data is different from the control panel identifier of the control panel, the data processing module 54 does not process the data.

In this embodiment, when the control panel wants to transmit the data to the upper computer, the channel request line setting module 51 first sets the state of the channel request line between the control panel and the serial port communication arbiter as "Valid", and then the channel response line checking module 52 checks the state of the channel response line between the control panel and the serial port communication arbiter. When the state of the channel response line is "Valid", the first data transmitting module 43 transmits the data to the upper computer over the channel between the control panel and the upper computer. As the first data transmitting module 43 directly transmits the data to the upper computer, the control panel requires only one serial port, and no serial port is required between the control panels. Thus the production cost for the control panel can be saved. Furthermore, all the control panels can directly communicate with the upper computer, so the processing burden of the main panel can be reduced and the system performance can be improved. In addition, programs for all the control panels are the same, which facilitates the maintenance.

Furthermore, the first data receiving module 53 can receive the data sent by the upper computer in broadcasting way, so each of the control panels can process the data synchronously.

Serial Port Communication Arbiter for a Touch Screen with Camera

First Embodiment

Figure 7:
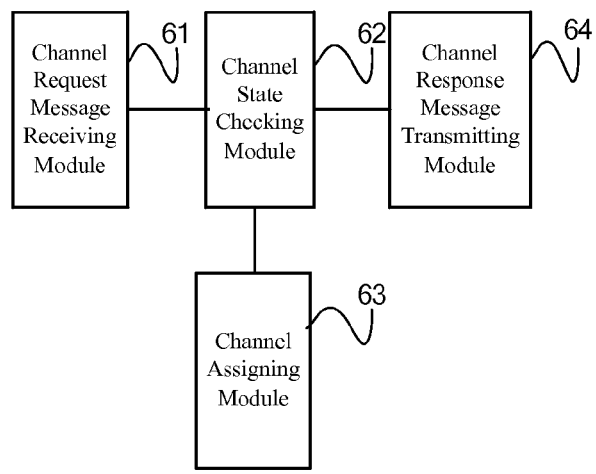
FIG. 7 is a structure diagram of a first embodiment of a serial port communication arbiter for a touch screen with camera according to the present invention.

FIG. 7 shows the structure diagram of the first embodiment of the serial port communication arbiter for the touch screen with camera according to the present invention. The serial port communication arbiter can include a channel request message receiving module 61, a channel state checking module 62, a channel assigning module 63 and a channel response message transmitting module 64. The channel state checking module 62 is connected to the channel request message receiving module 61, the channel assigning module 63 is connected to the channel state checking module 62, and the channel response message transmitting module 64 is connected to the channel state checking module 62.

The channel request message receiving module 61 is configured to receive the channel request message sent by any of the control panels of the touch screen with camera, and the channel request message requests for occupying the channel between the control panel and the upper computer. The channel state checking module 62 is configured to check the state of the channel between the control panel and the upper computer. The channel response message transmitting module 64 is configured to transmit the channel response message to the control panel, and the channel response message contains the state of the channel. Specifically, the state of the channel can include two states: "Idle" and "Non-Idle". The channel assigning module 63 is configured to assign the channel to the control panel when the state of the channel is "Idle".

In this embodiment, the channel request message receiving module 61 receives the channel request message sent by any of the control panels of the touch screen with camera. The channel state checking module 62 checks the state of the channel between the control panel and the upper computer based on the channel request message. The channel response message transmitting module 64 transmits the channel response message to the control panel, and the channel response message contains the state of the channel. When the state of the channel between the control panel and the upper computer is "Idle", the channel assigning module 63 assigns the channel to the control panel. The control panel can transmit the data to the upper computer over the channel. The control panel requires only one serial port, and no serial port is required between the control panels. So the production cost for the control panel can be saved. Furthermore, all the control panels can directly communicate with the upper computer, and thus the processing burden of the main panel can be reduced and the system performance can be improved. In addition, programs for all the control panels are the same, which facilitates the maintenance.

Second Embodiment

Figure 8:
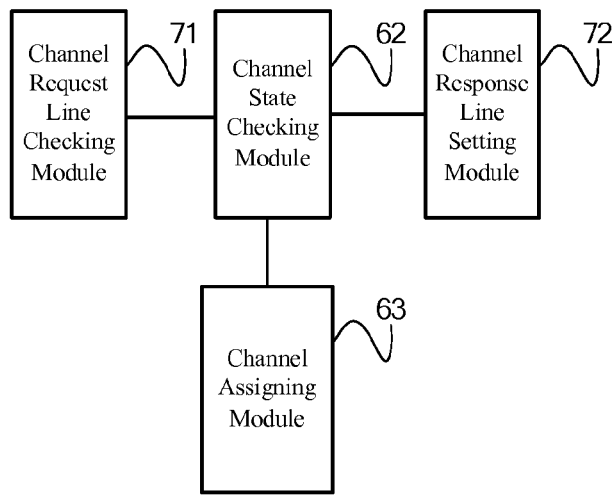
FIG. 8 is a structure diagram of a second embodiment of the serial port communication arbiter for the touch screen with camera according to the present invention.

FIG. 8 shows the structure diagram of the second embodiment of the serial port communication arbiter for the touch screen with camera according to the present invention, which differs from the structure diagram shown in FIG. 7 in that: in this embodiment, the channel request message receiving module 61 can be a channel request line checking module 71, and the channel response message transmitting module 64 can be a channel response line setting module 72.

The channel request line checking module 71 is configured to receive the channel request message sent from the control panel by checking the state of the channel request line between the control panel and the serial port communication arbiter. When the state of the channel request line is "Valid", it is equivalent to that the serial port communication arbiter receives the channel request message sent by the control panel. When the state of the channel request line is "Invalid", it is equivalent to that the serial port communication arbiter does not receive the channel request message sent by the control panel. In this embodiment, the channel state checking module 62 checks the state of the channel between the control panel and the upper computer when the state of the channel request line is "Valid". The channel response line setting module 72 is configured to set the state of the channel response line between the serial port communication arbiter and the control panel based on the state of the channel between the control panel and the upper computer, and transmit the channel response message to the control panel. Specifically, when the serial port communication arbiter sets the state of the channel response line as "Valid", it is equivalent to that the serial port communication arbiter transmits the channel response message to control panel. When the serial port communication arbiter sets the state of the channel response line as "Invalid", it is equivalent to that the serial port communication arbiter does not transmit the channel response message to control panel. When the state of the channel between the control panel and the upper computer is "Idle", the channel response line setting module 72 sets the state of the channel response line between the control panel and the serial port communication arbiter as "Valid", e.g. in high level. When the state of the channel between the control panel and the upper computer is "Non-Idle", i.e. the channel is occupied by other control panel, the channel response line setting module 72 sets the state of the channel response line between the control panel and the serial port communication arbiter as "Invalid", e.g. in low level.

In this embodiment, after finishing transmitting the data to the upper computer, the control panel sets the state of the channel request line as "Invalid". The channel response line setting module 72 can further be configured to set the state of the channel response line as "Invalid" after the serial port communication arbiter checks that the state of the channel request line is "Invalid".

The serial port communication arbiter can be implemented by CPLD or FPGA.

In this embodiment, the channel request line checking module 71 checks the state of the channel request line between the control panel and the serial port communication arbiter. When the state of the channel request line is "Valid", the channel state checking module 62 checks the state of the channel between the control panel and the upper computer. When the state of the channel is "Valid", the channel assigning module 63 assigns the channel to the control panel. The channel response line setting module 72 sets the state of the channel response line as "Valid". The control panels can transmit the data to the upper computer over the channel. The control panel requires only one serial port, and no serial port is required between the control panels. So the production cost for the control panel can be saved. Furthermore, the control panel can directly communicate with the upper computer when the state of the channel is "Valid", and thus the processing burden of the main panel can be reduced and the system performance can be improved. In addition, programs for all the control panels are the same, which facilitates the maintenance.

Touch Screen with Camera

First Embodiment

Figure 9:
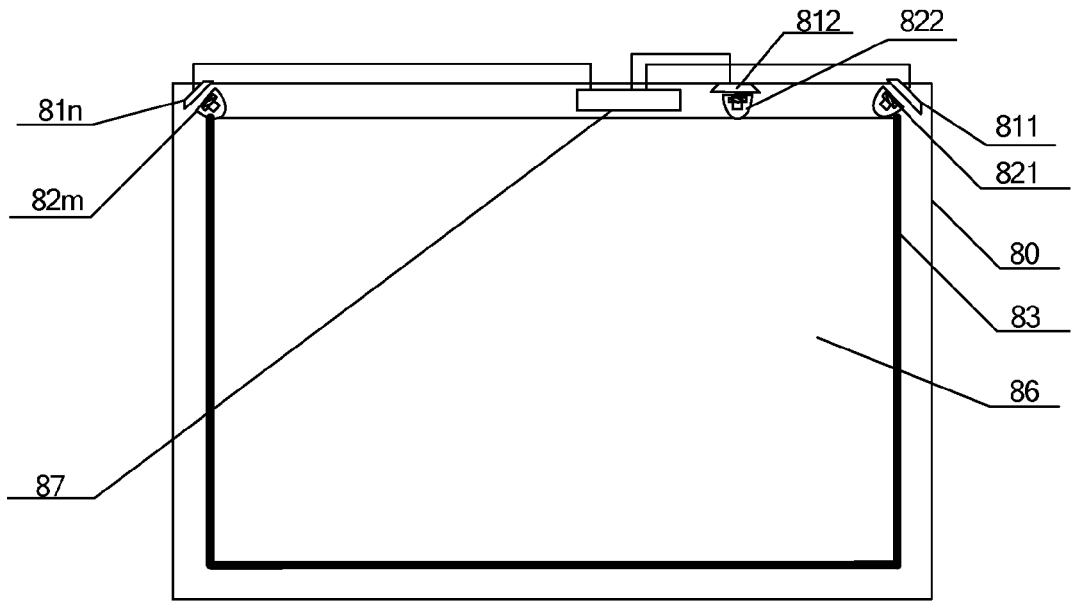
FIG. 9 is a structure diagram of a first embodiment of a touch screen with camera according to the present invention.

FIG. 9 shows the structure diagram of the first embodiment of the touch screen with camera according to the present invention. As shown in FIG. 9, the touch screen can include a touch screen frame 80, at least two cameras 811, 812 . . . 81*n*, at least two light sources 821, 822 . . . 82*m*, a retro-reflection strip 83, and a processing unit 87. The processing unit 87 can comprise a location information acquiring module, at least two control panels, and a serial port communication arbiter. The m and n are natural numbers which is equal to or greater than 2. Inside the touch screen frame 80 is a touch detection area 86. The at least two cameras 811, 812 . . . 81*n* are installed in the vicinity of the touch detection area 86. The at least two light sources 821, 822 . . . 82*m* are installed adjacent to the at least two cameras 811, 812 . . . 81*n* respectively. The retro-reflection strip 83 is disposed in the vicinity of the touch detection area 86. The location information acquiring module is connected to the at least two cameras 811, 812 . . . 81*n*. The at least two control panels are connected to the location information acquiring module, and the serial port communication arbiter is connected to the at least two control panels.

The retro-reflection strip 83 is configured to reflect the light emitted by the at least two light sources 821, 822 . . . 82*m* to the at least two cameras 811, 812 . . . 81*n*. The at least two cameras 811, 812 . . . 81*n* are configured to collect image data of the touch detection area 86. The location information acquiring module is configured to acquire location information of a touch object based on the image data collected by the at least two cameras 811, 812 . . . 81*n*. Each of the control panels is configured to transmit the channel request message to the serial port communication arbiter for requesting for occupying the channel between the control panel and the upper computer. The serial port communication arbiter is configured to receive the channel request message sent by the control panel, and checks the state of the channel between the control panel and the upper computer based on the channel request message. The serial port communication arbiter assigns the channel to the control panel when the state of the channel is "Idle", and transmits the channel response message to the control panel. The channel response message contains the state of the channel. Each of the control panels is further configured to receive the channel response message sent by the serial port communication arbiter, and transmit the data to the upper computer over the channel when the state of the channel between the control panel and the upper computer is "Idle".

Figure 10:
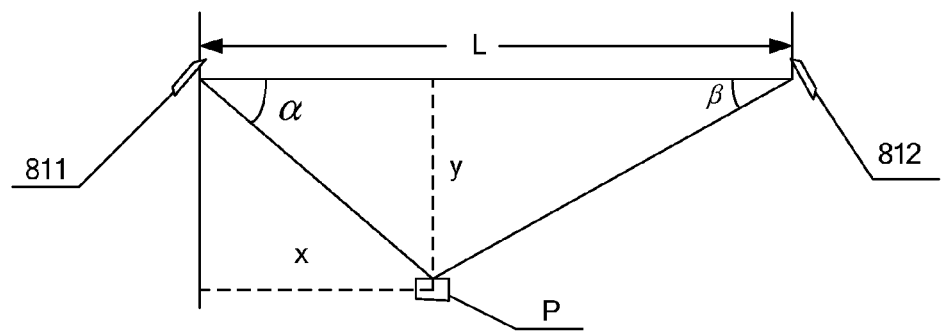
FIG. 10 is a work principle diagram of a processing unit for acquiring location information of a touch object in the first embodiment of the touch screen with camera according to the present invention.

Specifically, the location information acquiring module acquires the location information of the touch object based on the image data collected by two cameras of the at least two cameras 811, 812 ... 81n. FIG. 10 illustrates the work principle diagram of the processing unit acquiring the location information of the touch object in the first embodiment of the touch screen with camera according to the present invention. Given that the two cameras are the cameras 811, 812. The location information acquiring module can acquire angles α, β formed by a line between the touch object P and each camera and a connecting line between the two cameras based on the image data collected by the cameras 811 and 812. Assume that the distance between the cameras 811 and 812 is L and the position of the camera 811 is origin of coordinates, the horizontal ordinate x and vertical coordinate y of the touch object P may be obtained with triangulation according to the following formulas:

$$x=(L \times tg\beta)/(tg\alpha+tg\beta)$$

$$y=(L \times tg\beta \times tg\alpha)/(tg\alpha+tg\beta)$$

It should be noted that in this embodiment, the touch screen frame 80 may be omitted.

In this embodiment, the at least two cameras 811, 812 ... 81n collect the image data of the touch detection area 86. The location information acquiring module acquires the location information of the touch object based on the image data collected by the at least two cameras 811, 812 ... 81n. Each of the control panels transmits the channel request message to the serial port communication arbiter. The serial port communication arbiter checks the state of the channel between the control panel and the upper computer based on the channel request message, and transmits the channel response message to the control panel. The channel response message contains the state of the channel. When the state of the channel is "Idle", the channel is assigned to the control panel, and the control panel receives the channel response message sent by the serial port communication arbiter. When the state of the channel between the control panel and the upper computer is "Idle", the control panel transmits the data to the upper computer over the channel. The control panel requires only one serial port, and no serial port is required between the control panels. Thus the production cost for the control panel can be saved. Furthermore, all the control panels can directly communicate with the upper computer, so the processing burden of the main panel can be reduced and the system performance can be improved. In addition, programs for all the control panels are the same, which facilitates the maintenance.

In this embodiment, the control panel may comprise any module of the above described embodiments of the control panel for the touch screen with camera. The serial port communication arbiter may comprise any module of the above described embodiments of the serial port communication arbiter for the touch screen with camera.

Second Embodiment

Figure 11:
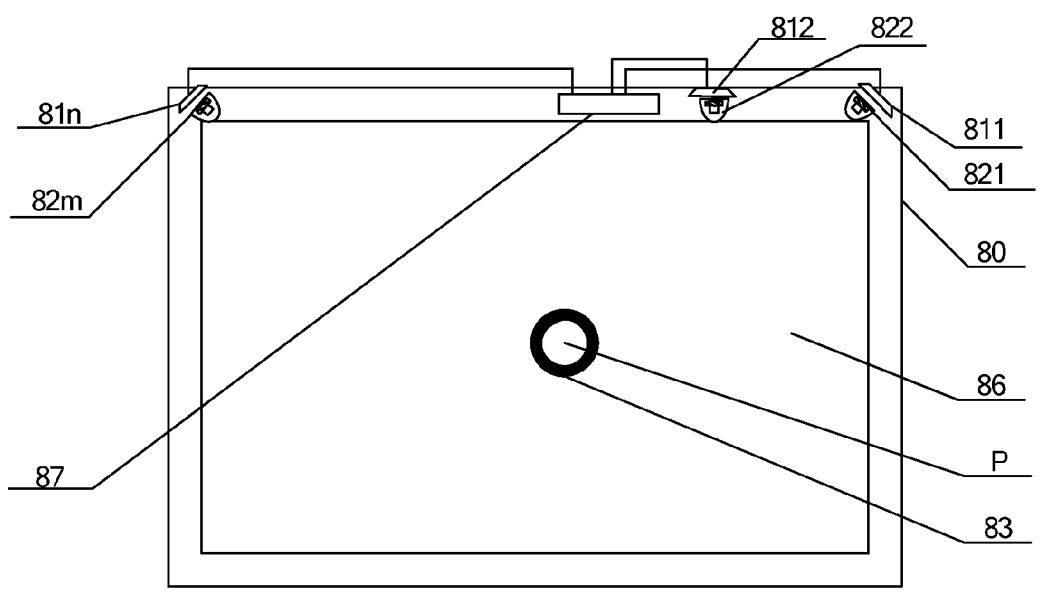
FIG. 11 is a structure diagram of a second embodiment of the touch screen with camera according to the present invention.

FIG. 11 shows the structure diagram of the second embodiment of the touch screen with camera according to the present invention. The touch screen can include a touch screen frame 80, at least two cameras 811, 812 ... 81n, at least two light sources 821, 822 ... 82m, a touch object P, and a processing unit 87. The processing unit 87 can comprise a location information acquiring module, at least two control panels, and a serial port communication arbiter. The m and n are natural numbers which is equal to or greater than 2. Inside the touch screen frame 80 is the touch detection area 86. The at least two cameras 811, 812 ... 81n are installed in the vicinity of the touch detection area 86. The at least two light sources 821, 822 ... 82m are installed adjacent to the at least two cameras 811, 812 ... 81n respectively. The touch object P is provided with a retro-reflection strip 83. The location information acquiring module is connected to the at least two cameras 811, 812 ... 81n. The at least two control panels are connected to the location information acquiring module, and the serial port communication arbiter is connected to the at least two control panels.

The retro-reflection strip 83 is configured to reflect the light emitted by the at least two light sources 821, 822 ... 82m to the touch object P to the at least two cameras 811, 812 ... 81n. The at least two cameras 811, 812 ... 81n are configured to collect the image data of the touch detection area 86. The location information acquiring module is configured to acquire the location information of a touch object based on the image data collected by the at least two cameras 811, 812 ... 81n. Each of the control panels is configured to transmit the channel request message to the serial port communication arbiter for requesting for occupying the channel between the control panel and the upper computer. The serial port communication arbiter is configured to receive the channel request message sent by the control panel, check the state of the channel between the control panel and the upper computer based on the channel request message. When the state of the channel is "Idle", the serial port communication arbiter assigns the channel to the control panel and transmits the channel response message to the control panel. The channel response message contains the state of the channel. Each of the control panels is further configured to receive the channel response message sent by the serial port communication arbiter, and transmits the data to the upper computer over the channel when the state of the channel between the control panel and the upper computer is "Idle".

In this embodiment, the details of how the location information acquiring module acquires the location information of the touch object can be obtained with reference to FIG. 10, the related description will be omitted here.

It should be noted that in this embodiment the touch screen frame 80 can be omitted. The form of cross section of the touch object P may be circular, square, triangular or any other forms.

In this embodiment, the at least two cameras 811, 812 ... 81n collect the image data of the touch detection area 86. The location information acquiring module acquires the location information of the touch object based on the image data collected by the at least two cameras 811, 812 ... 81n. Each of the control panels transmits the channel request message to the serial port communication arbiter. The serial port communication arbiter checks the state of the channel between the control panel and the upper computer based on the channel request message, and transmits the channel response message to the control panel. The channel response message contains the state of the channel. When the state of the channel is "Idle", the channel is assigned to control panel. The control panel receives the channel response message sent by the serial port communication arbiter, and transmits the data to the upper computer over the channel when the state of the channel between the control panel and the upper computer is "Idle". The control panel requires only one serial port, and no serial port is required between the control panels. Thus the production cost for the control panel can be saved. Furthermore, all the control panels can directly communicate with the upper computer, so the processing burden of the main panel can be reduced and the system performance can be improved. In addition, programs for all the control panels are the same, which facilitates the maintenance.

In this embodiment, the control panels may comprise any module of the above described embodiments of the control panel for the touch screen with camera, and the serial port communication arbiter may comprise any module of the above described embodiments of the serial port communication arbiter for the touch screen with camera mentioned above.

Third Embodiment

Figure 12:
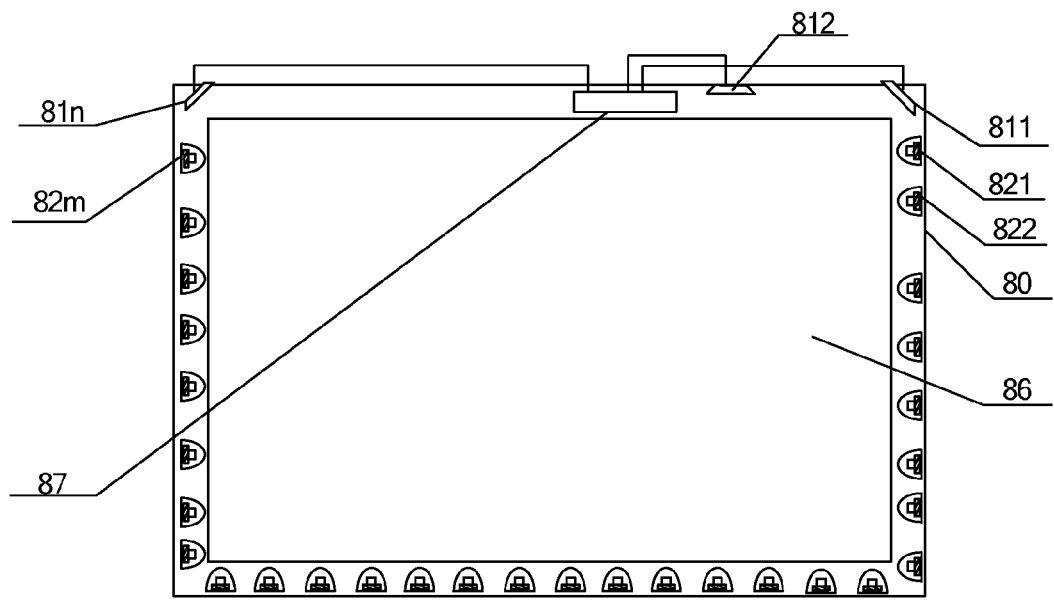
FIG. 12 is a structure diagram of a third embodiment of the touch screen with camera according to the present invention.

FIG. 12 shows the structure diagram of the third embodiment of the touch screen with camera according to the present invention. The touch screen can include the touch screen frame 80, at least two cameras 811, 812 . . . 81n, at least one light sources 821, 822 . . . 82m, and a processing unit 87. The processing unit can comprise the location information acquiring module, at least two control panels, and the serial port communication arbiter. M is the natural number which is equal to or greater than 1, and n is the natural number which is equal to or greater than 2. Inside the touch screen frame 80 is the touch detection area 86. The at least two cameras 811, 812 . . . 81n are installed in the vicinity of the touch detection area 86. The at least two light sources 821, 822 . . . 82m are installed in the vicinity of the touch detection area 86. The location information acquiring module is connected to the at least two cameras 811, 812 . . . 81n, and the serial port communication arbiter is connected to the at least two control panels.

The at least two light sources 821, 822 . . . 82m emit the light to the at least two cameras 811, 812 . . . 81n. The at least two cameras 811, 812 . . . 81n are configured to collect the image data of the touch detection area 86. The location information acquiring module is configured to acquire the location information of a touch object based on the image data collected by the at least two cameras 811, 812 . . . 81n. Each of the control panels is configured to transmit the channel request message to the serial port communication arbiter for requesting for occupying the channel between the control panel and the upper computer. The serial port communication arbiter is configured to receive the channel request message sent by the control panel, and check the state of the channel between the control panel and the upper computer based on the channel request message. When the state of the channel is "Idle", the serial port communication arbiter assigns the channel to the control panel, and transmits the channel response message to the control panel. The channel response message contains the state of the channel. Each of the control panels is further configured to receive the channel response message sent by the serial port communication arbiter, and transmit the data to the upper computer over the channel when the state of the channel between the control panel and the upper computer is "Idle".

In this embodiment, the details of how the location information acquiring module acquires location information of the touch object can be obtained with reference to FIG. 10, and the related description will be omitted here.

In this embodiment, the at least two cameras 811, 812 . . . 81n collect the image data of the touch detection area 86. The location information acquiring module acquires the location information of the touch object based on the image data collected by the at least two cameras 811, 812 . . . 81n. Each of the control panels transmits the channel request message to the serial port communication arbiter. The serial port communication arbiter checks the state of the channel between the control panel and the upper computer based on the channel request message, and transmits the channel response message to the control panel. The channel response message contains the state of the channel. When the state of the channel is "Idle", the channel is assigned to the control panel. The control panel receives the channel response message sent by the serial port communication arbiter, and transmits the data to the upper computer over the channel when the state of the channel between the control panel and the upper computer is "Idle". The control panel requires only one serial port, and no serial port is required between the control panels. Thus the production cost for the control panel can be saved. Furthermore, all the control panels can directly communicate with the upper computer, so the processing burden of the main panel can be reduced and the system performance can be improved. In addition, programs for all the control panels are the same, which facilitates the maintenance.

In this embodiment, the control panel may comprise any module of the above described embodiments of the control panel for the touch screen with camera, and the serial port communication arbiter may comprise any module of the above described embodiments of the serial port communication arbiter for the touch screen with camera.

The technical solution of the present invention is not limited to the embodiments described above. Those skilled in the art can obtain other implementations based on the technical solution of the present invention, which also fall into the scope of the present invention.

What is claimed is:

1. A communication method for a touch screen, comprising:
    transmitting a channel request message, the channel request message requesting for occupying a channel between a control panel of the touch screen and an upper computer;
    receiving a channel response message, the channel response message containing a state of the channel; and
    transmitting data to the upper computer over the channel if the state of the channel is "Idle".

2. The method according to claim 1, wherein transmitting a channel request message comprises:
    setting a state of a channel request line between the control panel and a communication arbiter of the touch screen; and
    indicating transmission of the channel request message if the state of the channel request line is set as "Valid";
    receiving a channel response message comprises:
    checking a state of a channel response line between the control panel and the communication arbiter; and
    indicating reception of the channel response message if the state of the channel response line is "Valid";
    the state of the channel response line is set as "Valid" if the state of the channel is "Idle".

3. The method according to claim 2, further comprising:
    when the data transmission is completed, setting the state of the channel request line as "Invalid".

4. The method according to claim 1, further comprising:
    receiving data sent by the upper computer over the channel, the received data including a control panel identifier for identifying the control panel; and
    processing the received data if the control panel identifier included in the received data is identical to a control panel identifier of the control panel.

5. A communication method for a touch screen, comprising:
- receiving a channel request message, the channel request message requesting for occupying a channel between a control panel of the touch screen and an upper computer;
- checking a state of the channel based on the channel request message;
- assigning the channel to the control panel if the state of the channel is "Idle"; and
- transmitting a channel response message, the channel response message containing the state of the channel.

6. The method according to claim 5, wherein receiving a channel request message comprises:
- checking a state of a channel request line between a communication arbiter of the touch screen and the control panel; and
- indicating reception of the channel request message if the state of the channel request line is "Valid";
- transmitting a channel response message comprises:
- setting a state of a channel response line between the communication arbiter and the control panel based on the state of the channel; and
- indicating transmission of the channel response message if the state of the channel response line is set as "Valid";
- the state of the channel response line is set as "Valid" if the state of the channel is "Idle".

7. The method according to claim 6, further comprising:
- setting the state of the channel response line as "Invalid" if the state of the channel is "Non-Idle".

8. A control panel for a touch screen, comprising:
- a channel request message transmitting module configured to transmit a channel request message, the channel request message requesting for occupying a channel between the control panel and an upper computer;
- a channel response message receiving module configured to receive a channel response message, the channel response message containing a state of the channel; and
- a first data transmitting module configured to transmit data to the upper computer over the channel if the state of the channel is "Idle".

9. The control panel according to claim 8, wherein the channel request message transmitting module comprises a channel request line setting module configured to set a state of a channel request line between the control panel and a communication arbiter of the touch screen, wherein it is indicated that the channel request message is transmitted if the state of the channel request line is set as "Valid";
- the channel response message receiving module comprises a channel response line checking module configured to check a state of a channel response line between the control panel and the communication arbiter, wherein it is indicated that the channel response message is received if the state of the channel response line is "Valid";
- the first data transmitting module is further configured to transmit the data to the upper computer over the channel if the state of the channel response line is "Valid".

10. The control panel according to claim 9, wherein the channel request line setting module is further configured to set the state of the channel request line as "Invalid" after the data transmission is completed.

11. The control panel according to claim 8, characterized in that the control panel further comprises:
- a first data receiving module configured to receive the data sent by the upper computer over the channel, the received data including a control panel identifier for identifying the control panel; and
- a data processing module configured to process the received data if the control panel identifier included in the received data is identical to a control panel identifier of the control panel.

12. A communication arbiter for a touch screen, comprising:
- a channel request message receiving module configured to receive a channel request message, the channel request message requesting for occupying a channel between a control panel of the touch screen and an upper computer;
- a channel state checking module configured to check a state of the channel between the control panel and the upper computer based on the channel request message;
- a channel assigning module configured to assign the channel to the control panel if the state of the channel is "Idle"; and
- a channel response message transmitting module configured to transmit a channel response message, the channel response message containing the state of the channel.

13. The communication arbiter according to claim 12, wherein the channel request message receiving module comprises a channel request line checking module configured to check a state of a channel request line between the control panel and the communication arbiter, wherein it is indicated that the channel request message is received if the state of the channel request line is "Valid";
- the channel response message transmitting module comprises a channel response line setting module configured to set a state of a channel response line between the communication arbiter and the control panel based on the state of the channel, wherein it is indicated that the channel response message is transmitted if the state of the channel response line is set as "Valid".

14. The communication arbiter according to claim 13, wherein the channel response line setting module is further configured to set the state of the channel response line as "Invalid" when the channel state checking module checks that the state of the channel is "Non-Idle".

15. A touch screen comprising at least two control panels and a communication arbiter, wherein the control panel comprises:
- a channel request message transmitting module configured to transmit a channel request message to the communication arbiter, the channel request message requesting for occupying a channel between the control panel and an upper computer;
- a channel response message receiving module configured to receive a channel response message, the channel response message containing a state of the channel; and
- a first data transmitting module configured to transmit data to the upper computer over the channel if the state of the channel is "Idle";
- the serial port communication arbiter comprises:
- a channel request message receiving module configured to receive the channel request message from the control panel;
- a channel state checking module configured to check a state of the channel between the control panel and the upper computer based on the channel request message;
- a channel assigning module configured to assign the channel to the control panel if the state of the channel is "Idle"; and
- a channel response message transmitting module configured to transmit a channel response message to the control panel.

16. The method according to claim 2, further comprising:
receiving data sent by the upper computer over the channel, the received data including a control panel identifier for identifying the control panel; and
processing the received data if the control panel identifier included in the received data is identical to a control panel identifier of the control panel.

17. The method according to claim 3, further comprising:
receiving data sent by the upper computer over the channel, the received data including a control panel identifier for identifying the control panel; and
processing the received data if the control panel identifier included in the received data is identical to a control panel identifier of the control panel.

18. The control panel according to claim 9, characterized in that the control panel further comprises:
a first data receiving module configured to receive the data sent by the upper computer over the channel, the received data including a control panel identifier for identifying the control panel; and
a data processing module configured to process the received data if the control panel identifier included in the received data is identical to a control panel identifier of the control panel.

19. The control panel according to claim 10, characterized in that the control panel further comprises:
a first data receiving module configured to receive the data sent by the upper computer over the channel, the received data including a control panel identifier for identifying the control panel; and
a data processing module configured to process the received data if the control panel identifier included in the received data is identical to a control panel identifier of the control panel.

* * * * *